US007164982B1

(12) United States Patent
Chinnadurai et al.

(10) Patent No.: US 7,164,982 B1
(45) Date of Patent: Jan. 16, 2007

(54) AUTOMOTIVE SCAN TOOLS WITH QUICK BOOT METHOD

(75) Inventors: Manokar Chinnadurai, Owatonna, MN (US); Troy Liebl, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/203,123

(22) Filed: Aug. 15, 2005

(51) Int. Cl.
*G06F 19/00* (2006.01)
*G08G 7/70* (2006.01)

(52) U.S. Cl. ........................ 701/101; 701/103; 701/115

(58) Field of Classification Search ......... 701/101–105, 701/114, 115; 73/116, 117.2, 117.3, 119 R, 73/119 A See application file for complete search history.

(56) References Cited

U.S. PATENT DOCUMENTS 4,325,251 A * 4/1982 Kanegae .................. 73/119 A
4,402,217 A * 9/1983 Higashiyama ............ 73/117.3
4,951,205 A * 8/1990 Lowe et al. .................. 701/63
5,602,738 A * 2/1997 Sasaki ........................ 701/115
5,787,381 A * 7/1998 Sasaki ........................ 701/115
RE36,437 E * 12/1999 Hanson et al. ........... 123/179.4
6,940,390 B1 * 9/2005 Emmei ....................... 340/5.6

* cited by examiner

*Primary Examiner*—Willis R. Wolfe, Jr.
(74) *Attorney, Agent, or Firm*—Baker & Hostetler LLP

(57) ABSTRACT

Exemplary embodiments of an improved scanning tool are disclosed. In various embodiments, the improved scanning tool uses at least one input capable of providing an indication of a desired operating mode of use; and an electronic control system configured to sense the desired operating mode indication, then select one of a plurality of operating system modes based on the desired operating mode indication.

20 Claims, 5 Drawing Sheets

AUTOMOTIVE SCAN TOOLS WITH QUICK BOOT METHOD

FIELD OF THE INVENTION

The present invention relates generally to the field of electronic testing devices.

BACKGROUND OF THE INVENTION

Automobiles have evolved from machines having minimalist electrical systems where an AM radio represented the most sophisticated on-board electronic device to technologically sophisticated machines using a variety of electronic sensors, microprocessors and custom-designed integrated circuitry. Today, most automotive electronic systems resemble a collection of independent, processor-controlled modules interconnected by a common local area network bus. Such modules can range in functionality from engine control to brake control to seat adjustment to emergency communication systems.

Unfortunately, as automobiles have evolved, so have the burdens of maintenance, repairs and upgrades. Modern automotive repairmen now need to be proficient electronic technicians as well as able mechanics. One tool often used by automotive technicians/repairmen for automotive maintenance and repair is known as a “scanning tool”, “scantool” or “scanner”. While scanners range greatly in sophistication and utility, they all generally work in generally the same way, i.e., by communicating with various automotive modules over a common network bus in order to perform queries of modules, order the modules to perform certain operations (e.g., self-tests), check certain functionality of the modules and so on.

A variety of scanner types have evolved from the very simple to the very sophisticated. While the simple scanners have limited functionality and quick response times, the more sophisticated scantools can be burdened with more lengthy response times, such as an onerous time to “boot up” after being powered. Accordingly even though a sophisticated scanner may be able to perform every function of a simple scanner, a technician may be loath to use the more sophisticated tool for simple diagnostics due to excessive waiting times, thus leading such a technician to buy and use two or more separate scanning tools. Accordingly, new technology directed to automotive scan tools is desirable.

SUMMARY OF THE INVENTION

In a first sense, an enhanced scanning apparatus for communicating with automotive electronic systems includes a first communication interface adapted to communicate with one or more automotive functional modules over a control/data bus, at least one input capable of providing an indication of a desired operating mode of use, a memory containing at least one operating system and one or more applications programs, and an electronic control system configured to sense the desired operating mode indication, then select one of a plurality of operating system modes based on the desired operating mode indication.

In a second sense, a method for selecting an operating system mode for a scanning apparatus includes starting or restarting the scanning apparatus, sensing at least one input that provides an indication of a desired operating mode of use, selecting one of a plurality of operating system modes based on the desired operating mode indication and executing a series of computer instructions designed to enable the selected operating system mode.

In a third sense, an enhanced scanning apparatus for communicating with automotive electronic systems includes a first communication interface adapted to communicate with one or more automotive functional modules over a control/data bus, at least one input capable of providing an indication of a desired operating mode of use, a memory containing at least one operating system and one or more applications programs, and a control means for sensing the desired operating mode indication, then selecting one of a plurality of operating system modes based on the desired operating mode indication.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example principles of this invention, wherein.

DETAILED DESCRIPTION OF THE INVENTION

As mentioned above, scanning tools with complex functionality may often take a relatively long time to “boot up” after being turned on, which can be an annoyance to a technician wishing to perform a simple test. As a result, such a technician might need to buy and maintain two separate scanning tools (a complex one and a simple one) to avoid the annoyance of waiting through long boot up times. However, to remedy this problem without the appreciable added expense of two separate scanning tools, the inventors of the disclosed methods and systems have devised an approach to minimizing boot-up time whenever a technician wishes to perform simple tasks. Set a switch in a first position and the scanning tool takes an appreciable time to boot, but all functionality is preserved. Set the same switch to a second position and the scanning tool is limited to a number of simple tasks, but boot-up time becomes relatively negligible.

Figure 1:
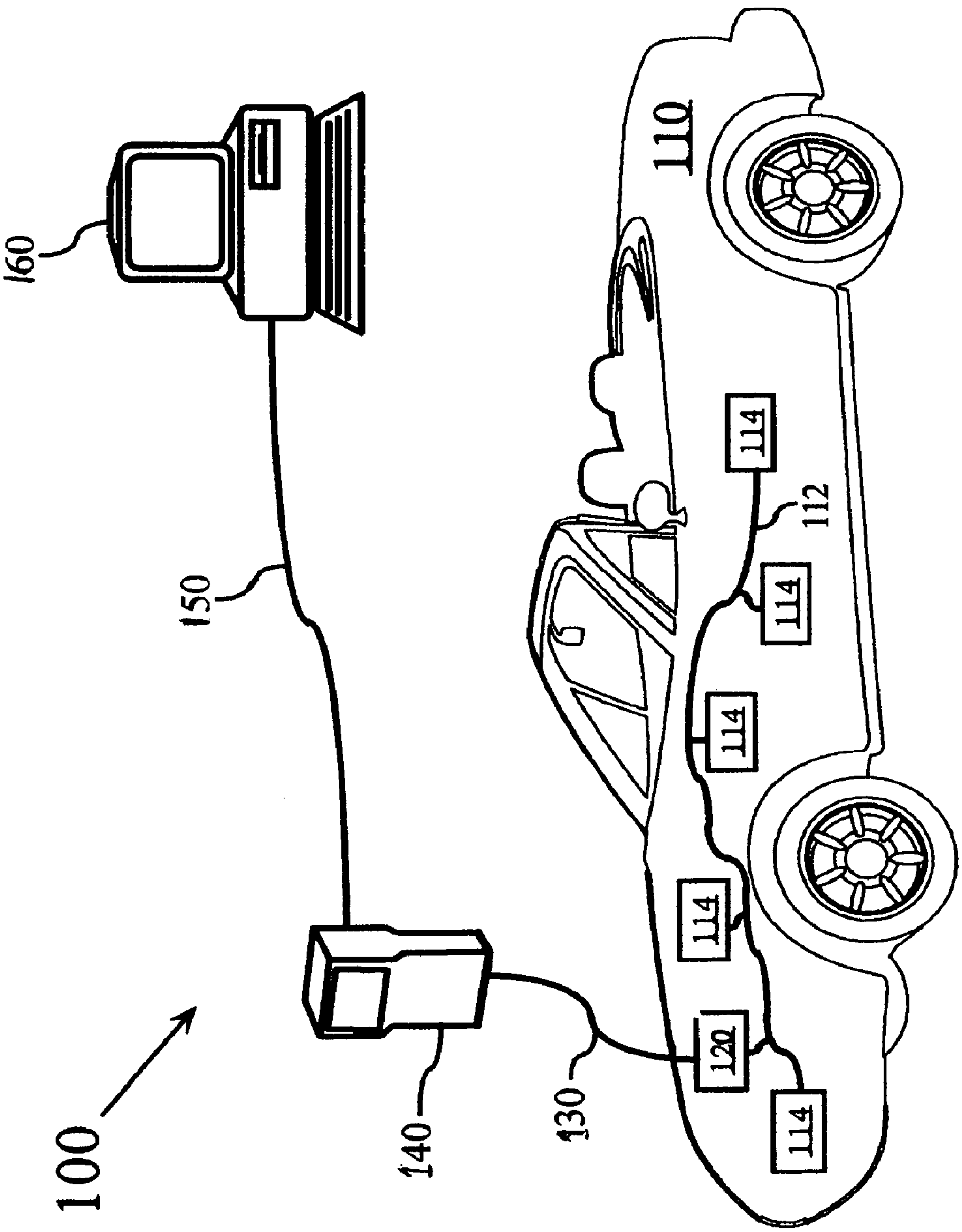
FIG. 1 depicts an diagnostic setup for an automobile using a scanning tool and personal computer.

FIG. 1 depicts a system 100 useful for various automotive-related functions, such a diagnosing and reprogramming modules. As shown in FIG. 1, the system 100 includes an automobile 110 coupled to a scanning tool 140 via link 130. The scanning tool 140 is also coupled to an external computer 160 via link 150. The automobile 110 includes a number of electronic control modules 114 coupled together via a common control/data bus 112. External access to the control/data bus 112 by the scanning tool 140 is accommodated by link 130 and connector interface 120.

While FIG. 1 depicts a hardwired link 150 between the scanning tool 140 and computer 160, it should be appreciated that this particular connection can be useful for only a subset of the total operations available to the scanning tool 140. Accordingly, for certain tests and other procedures, the system 100 of FIG. 1 may not require external computer 160 and/or link 150.

In operation, the scanning tool 140 can perform any number of operations from the very simple to the very complex. Should the scanning tool 140 perform only the most simple of tasks, the scanning tool's software need only be very basic dedicated control programs. However, given the increasing complexity of functions required for more complex operations, e.g., reprogramming automotive modules, it should be appreciated that the scanning tool 140 might benefit from the use of an operating system.

While the scanning tool 140 might in various embodiments use a general-purpose operating system, such as UNIX, DOS or Windows, the scanning tool 140 could (in more likely embodiments) use an "embedded operating system". An embedded operating system is a special-purpose computer operating system usually built into smaller devices. An embedded system is usually required to meet very different requirements than a general-purpose computer. Examples of embedded systems include automatic teller machines, cellular telephones, computer printers and hand-held diagnostic equipment, such as the scanning tool 140 of this disclosure. Such embedded operating systems often have specialized functionality and speed/response requirements, for which many embedded operating systems are called "real-time operating systems".

In general, an "operating system" (OS), whether "embedded", "real time" or otherwise, can be the first layer of software to be loaded into a computer system's memory when it starts up. As the first software layer, all other software (e.g., applications) that might be loaded after the OS depends upon the OS to provide them with various common core services. These common core services can include disk access, memory management, task scheduling and user interfacing, They can provide a foundation upon which to run application programs. Since the basic common services are assumed to be provided by the OS, there is no need to re-implement those same functions over and over again in every other piece of software that might be executed. The portion of code that performs these core services is sometimes called the "kernel" of the operating system. Operating system kernels had been evolved from libraries that provided the core services into unending programs that control all system resources.

In contrast to an embedded OS, the scanning tool may alternatively use a "dedicated control program", which can be defined as a single, unitary collection of instructions combining aspects of operating systems and application programs. Typically, such dedicated control programs are compiled and run as a single program.

Returning to FIG. 1, the scanning tool 140 can initially adopt any of a number of "operating system modes" depending upon the purpose for which a technician may want to apply the scanning tool 140. For the purpose of this disclosure, an "operating system mode" can be defined as a set of capabilities that a computer (in this case a controller residing in the scanning tool 140) may use. For example, a first operating system mode may allow for file reading but not file writing; a second operating system mode may allow for reading and writing, but not certain input/output operations; a third operating system mode may allow for the execution of an application, but not reading or writing of the same application. An operating system mode can be part of an operating system or merely part of a dedicated control program.

Once the scanning tool 140 has adopted an appropriate operating system mode, the operator can perform any number task that the operating system mode will support. Should the technician need to perform more complex tasks that a current operating system mode will allow, the technician can "re-boot" the scanning tool providing some indication as to the desired operating mode via a switch, button or other control.

As every OS or dedicated control program generally needs to initialize, i.e., boot, boot-up etc, upon power up or some other reset condition it should be appreciated that each OS and dedicated control program will include a section of "boot code" that controls the initialization of all peripherals and/or system control parameters. While most peripherals available to a scanning tool would be expected to take any appreciable time to accomplish, certain other booting operations might take extensive time. For example, enabling an operating system to read but not write to files can allow for a substantially shorter boot time than systems allowing for both reading and writing files. Also, by omitting certain built in tests upon boot, e.g., memory tests, several seconds to several minutes might be shaved from a boot operation.

Figure 2:
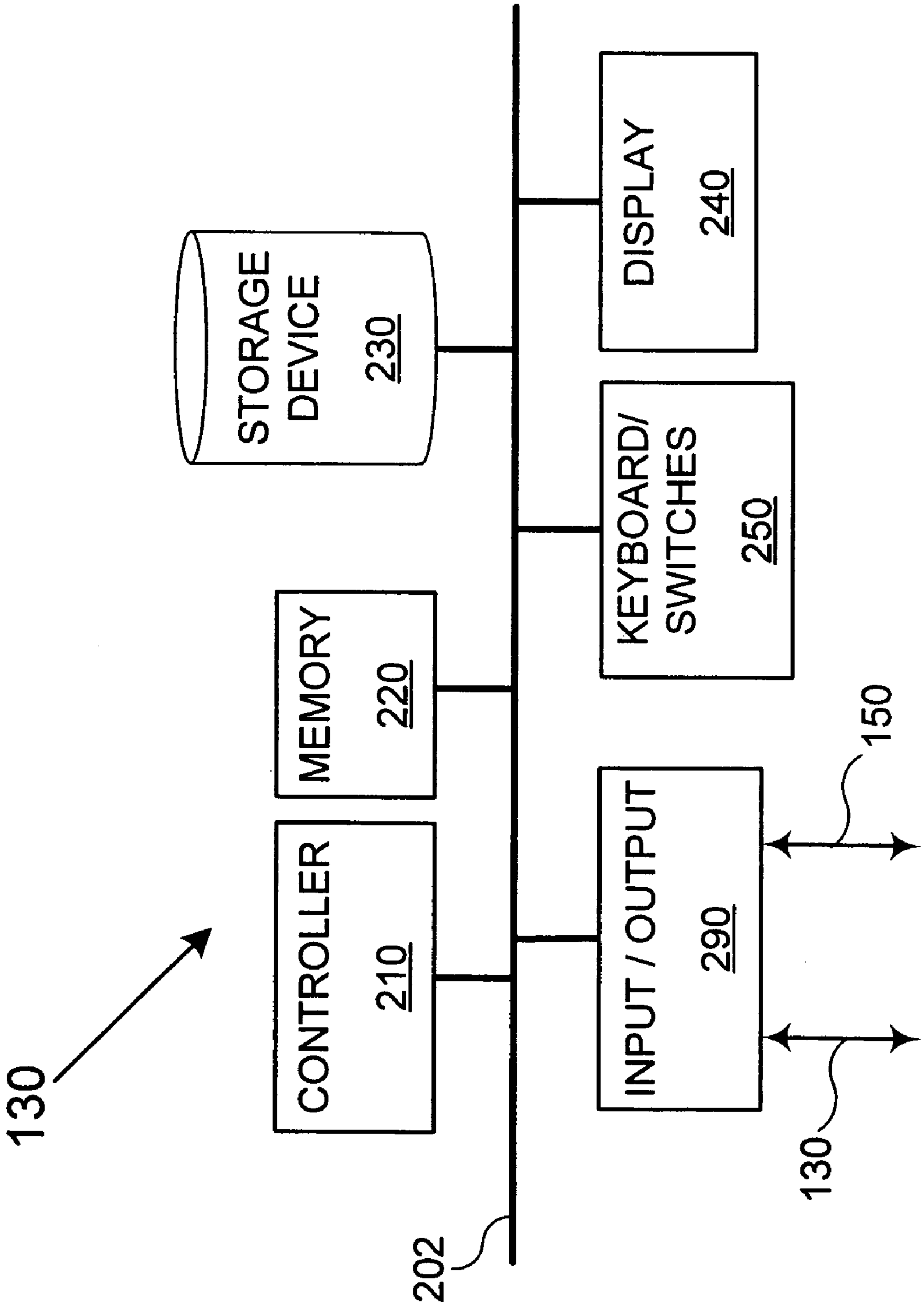
FIG. 2 shows details of an embodiment of the scanning tool of FIG. 1.

FIG. 2 depicts a block diagram of relevant portions of the scanning tool 140 of FIG. 1 according to various embodiments. As shown in FIG. 2, the exemplary scanning tool 140 includes a controller 210, a memory 220, a storage device 230, a display 240, a keyboard/keypad and set of switches 250 and an input/output device 290. The above components 210–290 are coupled together by control/data bus 202.

Although the exemplary scanning tool 140 of FIG. 2 uses a bussed architecture, it should be appreciated that other architectures may be used as is well known to those of ordinary skill in the art. For example, in various embodiments, the various components 210–290 can take the form of separate electronic components coupled together via a series of separate busses.

In operation, the controller 210 can first receive information about the desired speed of booting time desired via the keyboard/keypad and set of switches 250, the input/output device 290 or based on some other data source or set of conditions.

Subsequently, the controller 210 can access the storage device 230, select the appropriate software/firmware based on the received boot time information, then execute the selected software/firmware.

Figure 3:
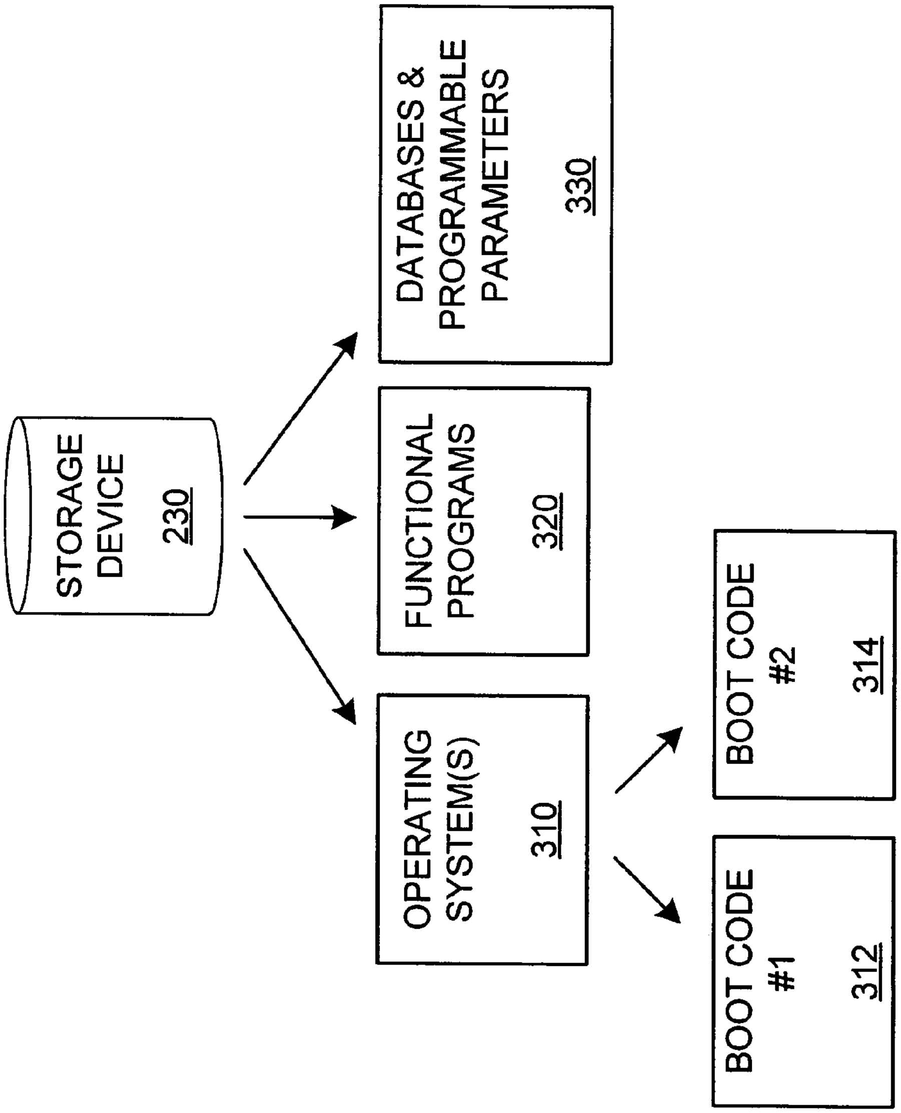
FIG. 3 depicts an exemplary organization of system software/firmware.

FIG. 3 depicts an exemplary organization of system software/firmware residing in the storage device 230 of FIG. 2. As shown in FIG. 3, system software/firmware can be stored in storage device 230 and can include a number of operating systems 310, a number of application/functional programs 320 and a number of data files 330 (e.g., databases or sets of programmable parameters).

The one or more operating systems 310 includes at least two separate sections of boot code 312 and 314, which as discussed above can cause a device, such as the scanning tool 140 of FIG. 2, to boot up at substantially different durations and perhaps enable the scanning tool 140 to perform markedly different ranges of operations. For example, should the first boot code 312 be selected and executed, the scanning tool might be fully enabled to perform a wide variety of operations; but should the second boot code 314 be selected and executed, the scanning tool might be limited to performing basic data manipulation.

While FIG. 3 depicts that a single operating system might have two optional, distinct sequences of boot code 312 and 314 (or perhaps two alternative operating systems having respective sequences of boot code 312 and 314), it should be appreciated that there is no limit as to the exact number of different operating systems that might be employed or the exact number of boot code sequences that might be employed in the various embodiments.

Still further, it should be appreciated that, instead of using a single operating system or plurality of operating systems, one or both of the boot code modules 312 or 314 might be associated with a dedicated control program such that, in a first mode of operation requiring simple data manipulation, a scanning tool might use such a dedicated control program while in a second operation requiring complex operations, e.g., uploading new applications and reprogramming automotive modules, a scanning tool might use a fully-enabled operating system.

Figure 4A:
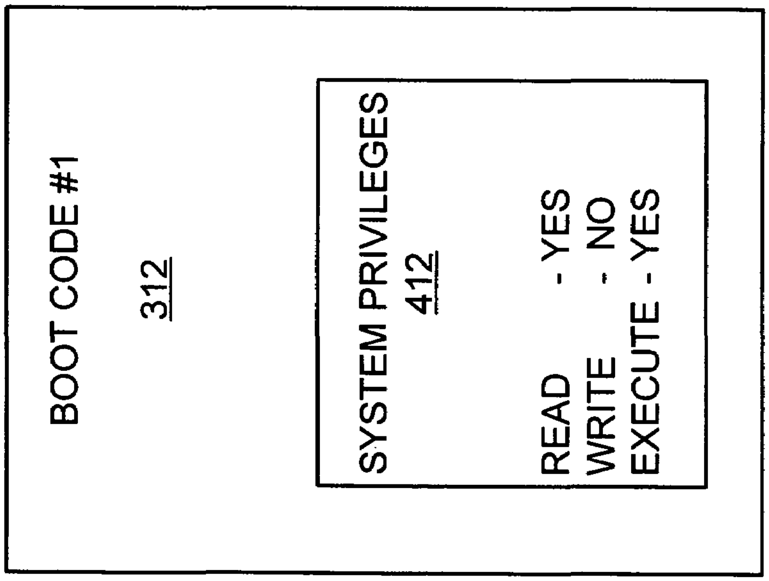
FIG. 4A is a representative depiction of a first boot code module.

FIG. 4A is a representative depiction of a first boot code module 312. As shown in FIG. 4A the first boot code module includes a number of system privileges 412 leading to a first operating system mode, such as the ability of the operating system to read an application program or data file, the inability of the operating system to write/store an application program or data file and the ability of the operating system to execute a number of application programs.

Figure 4B:
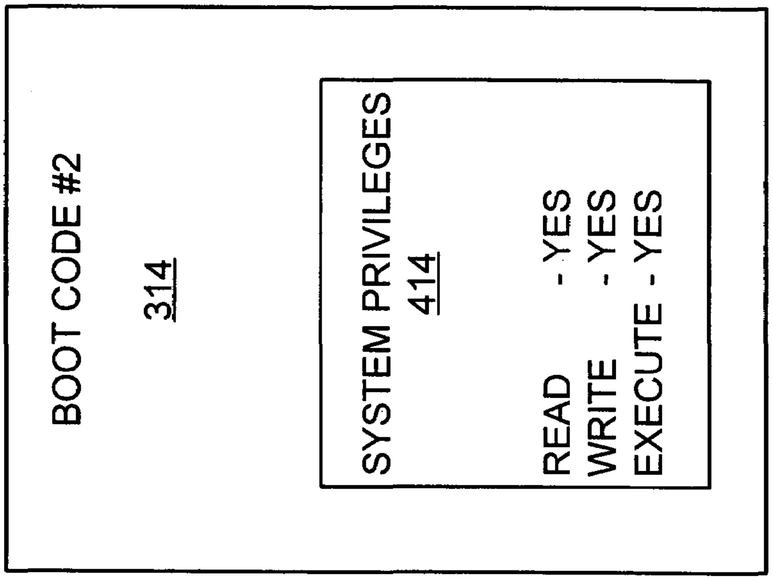
FIG. 4B is a representative depiction of a second boot code module.

FIG. 4B is a representative depiction of a second boot code module 4314. As shown in FIG. 4B the second boot code module includes a number of system privileges 414 leading to a second operating system mode, such as the ability of the operating system to read an application program or data file, the ability of the operating system to write/store an application program or data file and the ability of the operating system to execute a number of application programs.

In view of the above-discussed privilege differences (i.e. the first boot code module 312 will not allow various write operations while the second boot code module 314 will), the first boot code module 312 should execute much faster than the second boot code module. Other differences (not depicted) between the two modules 312 and 314 or between the two shown modules 312–314 and a third unseen module that might give rise to speed of booting advantages might include the omission of a built-in-test, the omission of an initialization of certain peripherals and so on. For the purposes of this disclosure, certain functions, such as built-in-test, that do not alter the fundamental workings of an OS kernel or dedicated control program, are not to be considered "system privileges" but can be considered "system modes."

Returning to FIG. 2, while in the present embodiment the controller 210 can directly manipulate which set of booting instructions is selected and executed, it should be appreciated that a booting sequence might be changed via hardware manipulation. For example, a switch at the keyboard/keypad and set of switches 250 might cause a piece of programmable logic to reconfigure the scanning tool's memory map. As most microprocessors and other controllers follow a specific pattern of operation upon boot-up, a change in memory map could aptly allow for a change in operating system modes. In other embodiments, some combination of direct controller control and non-controller hardware manipulation might be used.

Figure 5:
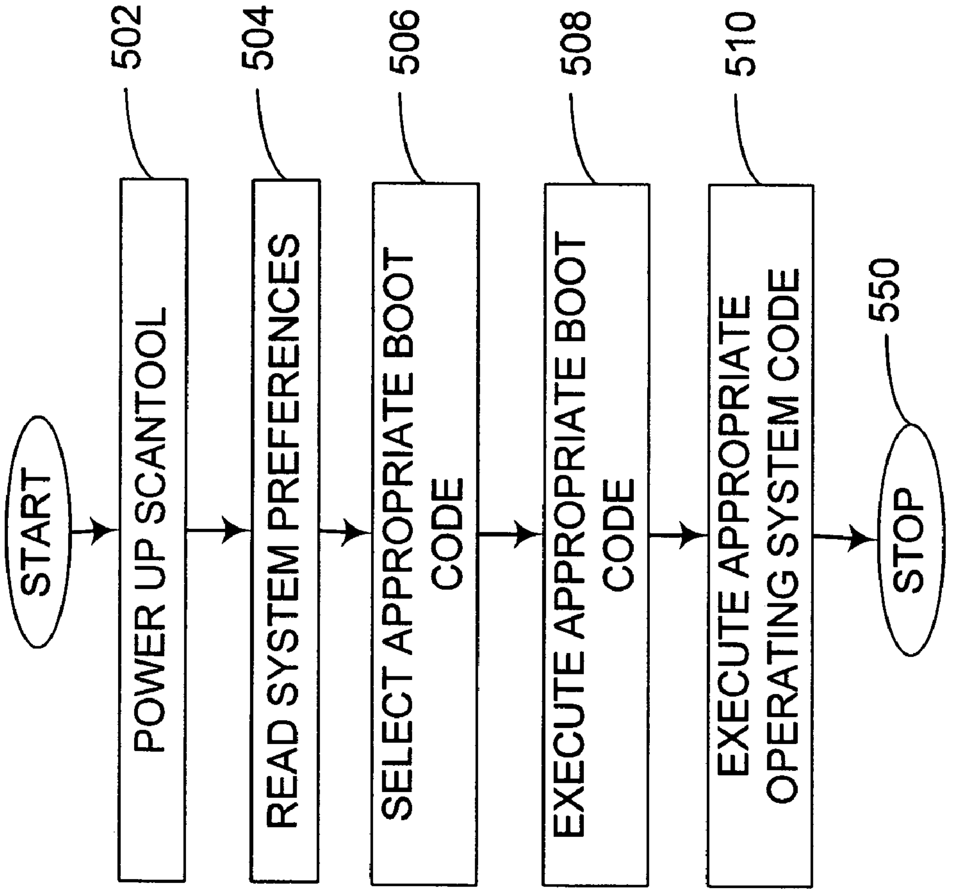
FIG. 5 is a flowchart outlining an exemplary operation according to the present disclosure.

FIG. 5 is a flowchart outlining a first exemplary operation according to the present disclosure for initiating an automotive scanning tool in one of a variety of operating system modes. The process starts in step 502 where the scanning tool is activated. Next, in step 504, a number of system preferences is read, such as "fast/slow" boot, perform built-in-test routines, or any other preference that might affect boot-up time. In various embodiments, such system preferences may be read by a microprocessor or other controller, while in other embodiments such preferences might be read by dedicated hardware, e.g., some piece of programmable logic. Control continues to step 506.

In step 506, the appropriate boot code, whether it be part of an operating system or a dedicated control program, is selected. In various embodiments (perhaps dependant on the nature of step 504), such a selection may take place by virtue of control commands by a microprocessor, while in other embodiments such a selection might take place by some other feat of hardware, i.e., some piece of programmable logic rearranging a memory map. Still other embodiments might use any other combination of direct processor control and non-processor manipulation. Control continues to step 508.

In step 508, the appropriate boot code selected in step 506 is executed with its associated boot-up time. Then, in step 510 (where applicable), the appropriate operating system code for an operating system is then executed. Control then continues to step 550 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer (such as a computer in a scanning tool), the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to automotive repair and maintenance services.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An enhanced scanning apparatus for communicating with automotive electronic systems and being adapted to decrease the time required by an operator to use the scanning apparatus for a variety of different operations, the scanning apparatus comprising:

a first communication interface adapted to communicate with one or more automotive functional modules over a control/data bus;

at least one input capable of providing an indication of a desired boot-up speed;

a memory containing at least one operating system and one or more applications programs; and a control means in communication with the first interface, input and memory, the control means for sensing the desired boot-up speed indication, then selecting a number of boot-up operations based on the desired boot-up speed.

2. An enhanced scanning apparatus for communicating with automotive electronic systems and being adapted to decrease the time required by an operator to use the scanning apparatus for a variety of different operations, the scanning apparatus comprising:

a first communication interface adapted to communicate with one or more automotive functional modules over a control/data bus;

at least one input capable of providing an indication of a desired operating mode of use;

a memory containing at least one operating system and one or more applications programs; and an electronic control system coupled to the first interface and memory, the electronic control system being configured to sense the desired operating mode indication, then select one of a plurality of operating system modes based on the desired operating mode indication.

3. The apparatus of claim 2, wherein at least one boot-up operation leads to a selection of a first operating system mode from a plurality of operating system modes, the plurality of operating system modes including a first mode and a second mode, the first mode enabling the scanning apparatus to boot up in a substantially shorter time than the second mode, wherein the shorter boot time of the first mode is attributable to one or more operating system privilege differences.

4. The apparatus of claim 2, wherein the plurality of operating system modes includes a first mode and a second mode, the first mode enabling the scanning apparatus to boot up in a substantially shorter time than the second mode.

5. The apparatus of claim 4, wherein the shorter boot time of the first mode over the second mode is attributable to the use of different sequences of computer instructions within the same operating system.

6. The apparatus of claim 4, wherein the shorter boot time of the first mode is attributable to the use of separate operating systems.

7. The apparatus of claim 4, wherein the shorter boot time of the first mode is attributable to one or more operating system privilege differences.

8. The apparatus of claim 7, wherein the one or more operating system privilege differences include an ability of the operating system to perform a write operation to at least one of an application program and a file.

9. The apparatus of claim 7, wherein the one or more operating system privilege differences include an ability of the operating system to perform a write operation to a database or a set of parameters.

10. The apparatus of claim 7, wherein the one or more operating system privilege differences include an ability of the operating system to receive and store a new application program.

11. The apparatus of claim 7, wherein the plurality of operating system modes are selected as a result of computer instructions designed to enable different operating system modes based on the desired operating mode indication.

12. The apparatus of claim 7, wherein the plurality of operating system modes are selected as a result of electronic hardware designed to cause a processor to incorporate different operating system modes based on the desired operating mode indication.

13. An method for selecting an operating system mode for a scanning apparatus, the scanning apparatus being adapted to communicate with automotive electronic systems, the method being adapted to decrease the time required by an operator to use the scanning apparatus for a variety of different operations, the method comprising:

starting or restarting the scanning apparatus;

sensing at least one input that provides an indication of a desired operating mode of use;

selecting one of a plurality of operating system modes based on the desired operating mode indication; and executing a series of computer instructions designed to enable the selected operating system mode.

14. The method of claim 13, wherein the plurality of operating system modes includes a first mode and a second mode, the first mode enabling the scanning apparatus to boot up in a substantially shorter time than the second mode.

15. The method of claim 14, wherein the shorter boot time of the first mode over the second mode is attributable to the use of different sequences of computer instructions within the same operating system.

16. The apparatus of claim 14, wherein the shorter boot time of the first mode is attributable to the use of separate operating systems.

17. The method of claim 14, wherein the shorter boot time of the first mode is attributable to one or more operating system privilege differences.

18. The method of claim 17, wherein the one or more operating system privilege differences include an ability of the operating system to perform a write operation to at least one of an application program and a file.

19. The method of claim 17, wherein the one or more operating system privilege differences include an ability of the operating system to perform a write operation to a database or a set of parameters.

20. The method of claim 17, wherein the one or more operating system privilege differences include an ability of the operating system to receive and store a new application program.

* * * * *